«12» United States Patent
Lee et al.

US010304632B2

(10) Patent No.: US 10,304,632 B2
(45) Date of Patent: May 28, 2019

(54) MULTILAYER CERAMIC ELECTRONIC COMPONENT WITH IMPROVED WITHSTAND VOLTAGE CHARACTERISTICS AND METHOD OF MANUFACTURING THE SAME

(71) Applicant: SAMSUNG ELECTRO-MECHANICS CO., LTD., Suwon-si, Gyeonggi-do (KR)

(72) Inventors: Seung Ho Lee, Suwon-si (KR); Jae Yeol Choi, Suwon-si (KR); Ki Pyo Hong, Suwon-si (KR); Beom Seock Oh, Suwon-si (KR)

(73) Assignee: Samsung Electro-Mechanics Co., Ltd., Suwon-si, Gyeonggi-do (KR)

( * ) Notice: Subject to any disclaimer, the term of this patent is extended or adjusted under 35 U.S.C. 154(b) by 125 days.

(21) Appl. No.: 15/217,233

(22) Filed: Jul. 22, 2016

(65) Prior Publication Data

US 2017/0154733 A1  Jun. 1, 2017

(30) Foreign Application Priority Data

Nov. 27, 2015  (KR) .................. 10-2015-0167490

(51) Int. Cl.
*H01G 4/30* (2006.01)
*H01G 4/012* (2006.01)
(Continued)

(52) U.S. Cl.
CPC ............ *H01G 4/308* (2013.01); *H01G 4/012* (2013.01); *H01G 4/232* (2013.01); *H01G 4/30* (2013.01); *H01G 4/12* (2013.01); *H01G 4/1227* (2013.01)

(58) Field of Classification Search
CPC .......... H01G 4/308; H01G 4/232; H01G 4/30; H01G 4/012; H01G 4/12
See application file for complete search history.

(56) References Cited

U.S. PATENT DOCUMENTS 6,475,317 B1 * 11/2002 Baba ..................... B32B 18/00
                                                           156/89.12
7,394,644 B2    7/2008 Kojima
(Continued)

FOREIGN PATENT DOCUMENTS

CN       1591717 A     3/2005
CN       1841594 A    10/2006
(Continued)

OTHER PUBLICATIONS

Korean Office Action dated Nov. 16, 2016, issued in Korean patent application No. 10-2015-0167490. (w/ English translation).
(Continued)

*Primary Examiner* — David M Sinclair
(74) *Attorney, Agent, or Firm* — Morgan Lewis & Bockius LLP

(57) ABSTRACT

A multilayer ceramic electronic component includes a ceramic body contributing to capacitance formation and including an active region formed by alternately stacking dielectric layers and first and second internal electrodes and, and a protective layer provided on at least one of upper and lower surfaces of the active region; and first and second external electrodes formed on respective ends of the ceramic body, wherein a step portion absorption layer is disposed in at least one of: both end portions of the ceramic body in a length direction or both end portions of the ceramic body in a width direction, and a total thickness of dielectric layers disposed on the same plane as the step portion absorption layer is greater than a thickness of a dielectric layer disposed in another region.

27 Claims, 18 Drawing Sheets

(51) Int. Cl.
*H01G 4/232* (2006.01)
*H01G 4/12* (2006.01)

(56) References Cited

U.S. PATENT DOCUMENTS

| | | | | |
|---|---|---|---|---|
| 7,436,650 | B2 * | 10/2008 | Oguni | H01G 4/012 |
| | | | | 361/306.1 |
| 8,879,237 | B2 | 11/2014 | Lee et al. | |
| 2001/0006451 | A1 * | 7/2001 | Miyazaki | B32B 18/00 |
| | | | | 361/321.2 |
| 2006/0214263 | A1 * | 9/2006 | Kojima | H01G 4/012 |
| | | | | 257/532 |
| 2006/0256504 | A1 * | 11/2006 | Kojima | H01G 4/01 |
| | | | | 361/311 |
| 2012/0140377 | A1 * | 6/2012 | Kim | H01G 4/1227 |
| | | | | 361/321.2 |
| 2012/0306325 | A1 * | 12/2012 | Kim | H01G 4/30 |
| | | | | 310/366 |
| 2013/0163143 | A1 | 6/2013 | Lee et al. | |
| 2014/0022690 | A1 * | 1/2014 | Kim | H01G 4/30 |
| | | | | 361/301.4 |
| 2014/0043723 | A1 * | 2/2014 | Hattori | H05K 1/0216 |
| | | | | 361/301.4 |
| 2017/0243695 | A1 * | 8/2017 | Kim | H01G 4/012 |

FOREIGN PATENT DOCUMENTS

| | | |
|---|---|---|
| CN | 1870190 A | 11/2006 |
| CN | 103177872 A | 6/2013 |
| JP | 8-148371 A | 6/1996 |
| JP | 2004-269325 A | 9/2004 |
| JP | 2006-332285 A | 12/2006 |
| JP | 2008-016706 A | 1/2008 |
| JP | 2009-289958 A | 12/2009 |
| KR | 10-2013-0072531 A | 7/2013 |

OTHER PUBLICATIONS

Chinese Office Action dated Jul. 16, 2018 issued in Chinese Patent Application No. 201610663897.5 (with English translation).

* cited by examiner

MULTILAYER CERAMIC ELECTRONIC COMPONENT WITH IMPROVED WITHSTAND VOLTAGE CHARACTERISTICS AND METHOD OF MANUFACTURING THE SAME

CROSS-REFERENCE TO RELATED APPLICATION

This application claims the benefit of priority to of Korean Patent Application No. 10-2015-0167490 filed on Nov. 27, 2015, with the Korean Intellectual Property Office, the disclosure of which is incorporated herein by reference.

BACKGROUND

The present disclosure relates to a multilayer ceramic electronic component in which withstand voltage characteristics are improved by decreasing a step portion in a component of a high-capacitance multilayer ceramic electronic component, and a method of manufacturing the same.

A multilayer ceramic electronic component includes a plurality of stacked dielectric layers, internal electrodes disposed to face each other with respective dielectric layers interposed therebetween, and external electrodes electrically connected to the internal electrodes.

Such a multilayer ceramic electronic component has been widely used as a component in computers, mobile communications devices such as personal digital assistants (PDA), mobile phones, and the like, due to advantages thereof such as a small size, high capacitance, ease of mountability, or the like.

As electronic products have been reduced in size and have had multifunctionality implemented therein, electronic components have also become compact and highly functional, and thus a multilayer ceramic electronic component which is small but has high capacitance has been demanded.

Generally, in a method of manufacturing a multilayer ceramic electronic component, a ceramic green sheet is manufactured, and an internal electrode layer is formed by printing a conductive paste on the ceramic green sheet. Several tens to several hundreds of ceramic green sheets on which internal electrode layers are formed may be stacked, thereby forming a green ceramic body.

After a hard green ceramic body is formed by compressing the green ceramic body at a high temperature and a high pressure and is cut, a multilayer ceramic capacitor is completed by calcining, sintering, and polishing the cut green ceramic body and forming external electrodes thereon.

As the number of stacked ceramic green sheets has increased, a problem affecting product reliability may occur when the ceramic green sheets are stacked and compressed.

The ceramic green sheet is composed of an internal electrode formation portion and a margin portion, an internal electrode non-formation portion. When the ceramic green sheets are compressed after stacking, a step portion between the internal electrode formation portion and the margin portion may be increased, which can deteriorate withstand voltage characteristics.

The step portion may be generated due to a difference in density of the internal electrodes and the dielectric layers between the internal electrode formation portion and the margin portion.

In order to solve the step portion problem as described above, a method of adding a separate ceramic material to a margin portion of a ceramic body using a negative printing method has been used. However, it can be significantly difficult to separately print ceramic slurry on the margin portion, the internal electrode non-formation portion, in the ceramic green sheet.

Furthermore, the method of adding a separate ceramic material to the margin portion using the negative printing method does not have a high precision and thus may not sufficiently decrease the step portion when there is an alignment defect of the ceramic green sheet after stacking.

SUMMARY

An aspect of the present disclosure may provide a multilayer ceramic electronic component in which withstand voltage characteristics are improved by decreasing a step portion in a component of a high-capacitance multilayer ceramic electronic component, and a method of manufacturing the same.

According to an aspect of the present disclosure, a multilayer ceramic electronic component may include: a ceramic body including an active region contributing to capacitance formation and formed by alternately stacking dielectric layers and first and second internal electrodes, and a protective layer provided on at least one of upper and lower surfaces of the active region; and first and second external electrodes electrically connected to the first and second internal electrodes, respectively, and formed on respective ends of the ceramic body, wherein a step portion absorption layer is disposed in at least one of: both end portions of the ceramic body in a length direction or both end portions of the ceramic body in a width direction, and a total thickness of dielectric layers disposed in a side portion of a region in which the step portion absorption layer is disposed is greater than a thickness of a dielectric layer disposed in another region.

According to another aspect of the present disclosure, a multilayer ceramic electronic component may include: a ceramic body including an active region contributing to capacitance formation and formed by alternately stacking dielectric layers and first and second internal electrodes, and a protective layer provided on at least one of upper and lower surfaces of the active region; and first and second external electrodes electrically connected to the first and second internal electrodes, respectively, and formed on respective ends of the ceramic body, wherein at least one gap portion is disposed in both end portions, and a distance between two internal electrodes adjacent to the gap portion is greater than a distance between two other internal electrodes.

According to another aspect of the present disclosure, a multilayer ceramic electronic component may include: a ceramic body including an active region contributing to capacitance formation and formed by alternately stacking dielectric layers and first and second internal electrodes, and a protective layer provided on at least one of upper and lower surfaces of the active region; and first and second external electrodes electrically connected to the first and second internal electrodes, respectively and formed on respective ends of the ceramic body, wherein at least one gap portion is disposed in both end portions of the active region, and two internal electrodes adjacent to the gap portion are bent in directions away from the gap portion in a stacking direction of the internal electrodes.

According to another aspect of the present disclosure, a method of manufacturing a multilayer ceramic electronic component may include: preparing a first ceramic green sheet and a second ceramic green sheet; forming an internal electrode pattern on the first ceramic green sheet using a conductive metal paste; forming a ceramic member on at least one: of both end portions of the second ceramic green sheet in a length direction or both end portions thereof in a width direction to forma step portion absorption layer; stacking the first ceramic green sheet and the second ceramic green sheet to forma ceramic body including dielectric layers and first and second internal electrodes; and forming first and second external electrodes electrically connected to the first and second internal electrodes, respectively, wherein the ceramic body includes an active region contributing to capacitance formation and a protective layer provided on at least one of upper and lower surfaces of the active region, and the active region is formed by repeating the stacking of two or more first ceramic green sheets and the stacking of the second ceramic green sheets thereon.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1:
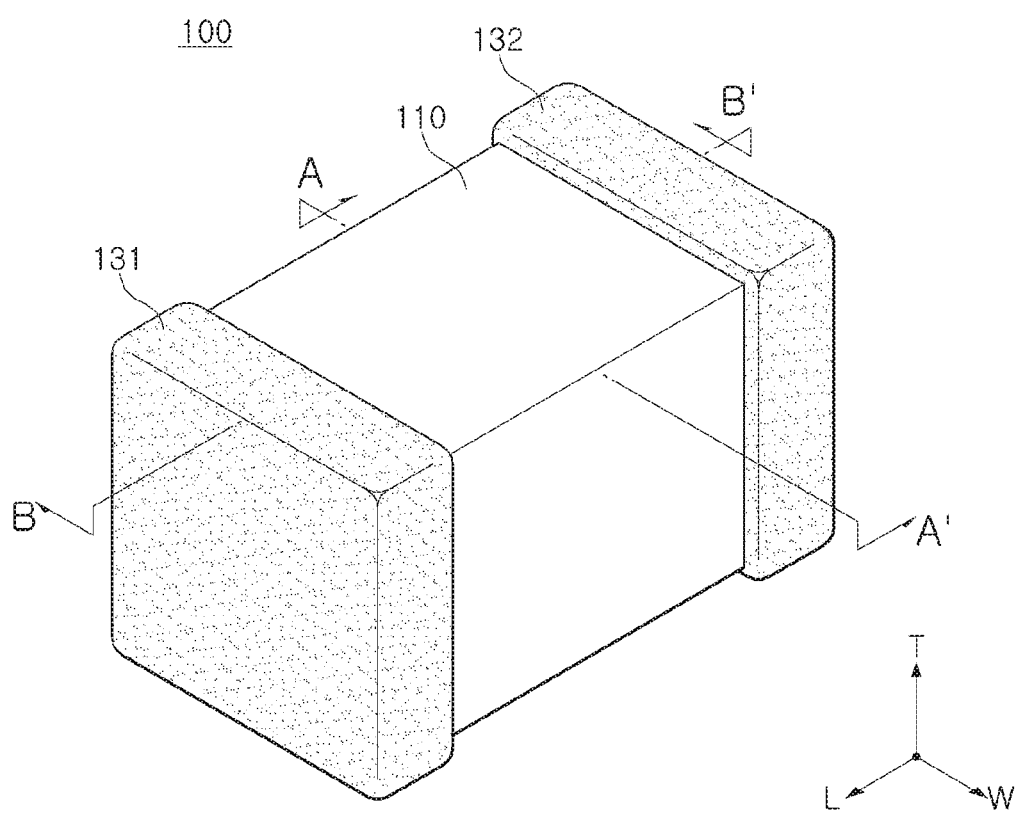
FIG. 1 is a perspective view schematically illustrating a multilayer ceramic capacitor according to an exemplary embodiment in the present disclosure.

Hereinafter, embodiments of the present inventive concept will be described as follows with reference to the attached drawings.

The present inventive concept may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

Throughout the specification, it will be understood that when an element, such as a layer, region or wafer (substrate), is referred to as being "on," "connected to," or "coupled to" another element, it can be directly "on," "connected to," or "coupled to" the other element, or other elements intervening therebetween may be present. In contrast, when an element is referred to as being "directly on," "directly connected to," or "directly coupled to" another element, there are no elements or layers intervening therebetween. Like numerals refer to like elements throughout. As used herein, the term "and/or" includes any and all combinations of one or more of the associated listed items.

It will be apparent that though the terms first, second, third, etc. may be used herein to describe various members, components, regions, layers, and/or sections, these members, components, regions, layers, and/or sections should not be limited by these terms. These terms are only used to distinguish one member, component, region, layer, or section from another region, layer, or section. Thus, a first member, component, region, layer, or section discussed below could be termed a second member, component, region, layer, or section without departing from the teachings of the exemplary embodiments.

Spatially relative terms, such as "above," "upper," "below," and "lower" and the like, may be used herein for ease of description to describe one element's relationship to another element(s) as shown in the figures. It will be understood that the spatially relative terms are intended to encompass different orientations of the device in use or operation in addition to the orientation depicted in the figures. For example, if the device in the figures is turned over, elements described as "above" or "upper" other elements would then be oriented "below" or "lower" the other elements or features. Thus, the term "above" can encompass both the above and below orientations depending on a particular direction of the figures. The device may be otherwise oriented (rotated 90 degrees or at other orientations) and the spatially relative descriptors used herein may be interpreted accordingly.

Hereinafter, the present inventive concept will be described with reference to schematic views illustrating certain embodiments. In the drawings, modifications of the shape shown may be estimated, for example, due to manufacturing techniques and/or tolerances. Thus, embodiments of the present inventive concept should not be construed as being limited to the particular shapes of regions shown herein, for example, to include a change in shape results in manufacturing. The following embodiments may also be constituted by one or a combination thereof.

The contents of the present inventive concept described below may have a variety of configurations and propose only a required configuration herein, but are not limited thereto.

Hereinafter, a multilayer ceramic electronic component according to an exemplary embodiment in the present disclosure will be described with reference to the accompanying drawings. Particularly, a multilayer ceramic capacitor will be described, but the multilayer ceramic electronic component is not limited thereto.

Figure 2:
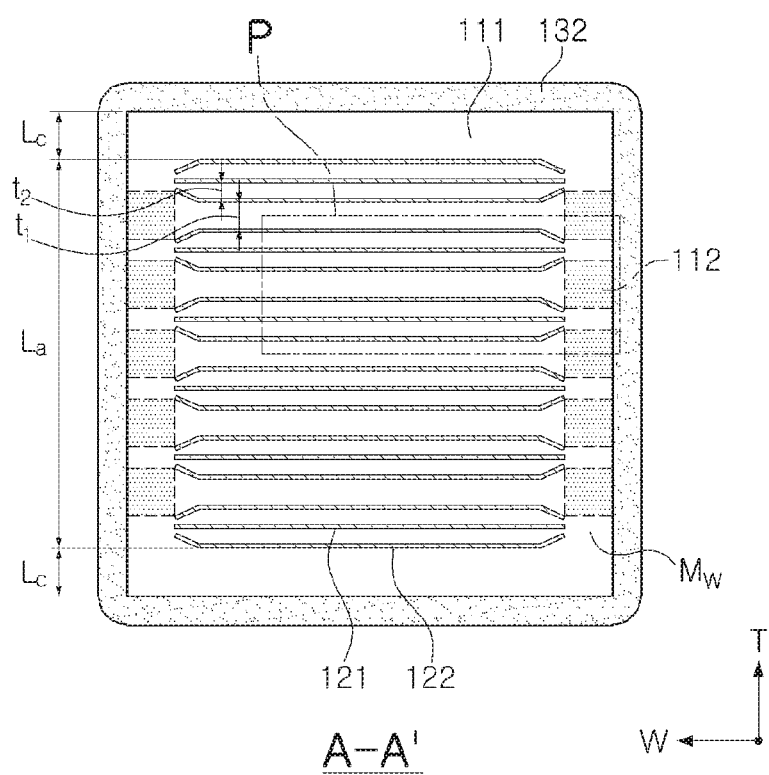
FIG. 2 is a cross-sectional view taken along line A-A' of FIG. 1 in order to illustrate the exemplary embodiment in the present disclosure.

FIG. 1 is a perspective view schematically illustrating a multilayer ceramic capacitor according to an exemplary embodiment in the present disclosure, and FIG. 2 is a cross-sectional view taken along line A-A' of FIG. 1.

Figure 3:
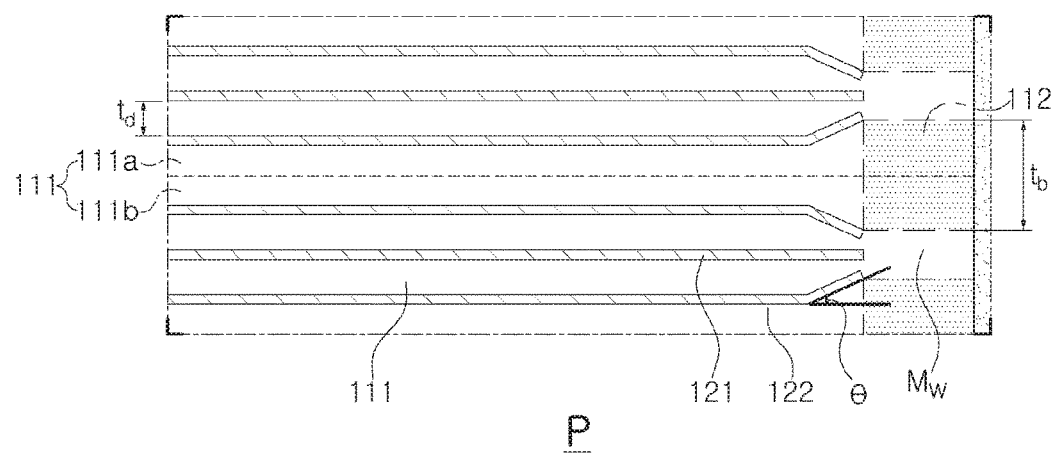
FIG. 3 is an enlarged view of part P of FIG. 2.

FIG. 3 is an enlarged view of part P of FIG. 2.

Referring to FIGS. 1-3, a multilayer ceramic capacitor 100 according to the exemplary embodiment in the present disclosure may include a ceramic body 110 in which dielectric layers 111 and first and second internal electrodes, 121 and 122 are alternately stacked, and first and second external electrodes 131 and 132 are electrically connected to the first internal electrodes 121 and the second internal electrodes 122, and are exposed to respective ends of the ceramic body 110.

According to the exemplary embodiment in the present disclosure, a 'length direction' of the multilayer ceramic capacitor refers to an 'L' direction of FIG. 1, a 'width direction' thereof refers to a 'W' direction of FIG. 1, and a 'thickness direction' thereof refers to a 'T' direction of FIG. 1. The 'thickness direction' is the same as a direction in which dielectric layers are stacked, that is, a 'stacking direction.'

A shape of the ceramic body 110 is not particularly limited, but generally, may be a hexahedral shape. Further, the ceramic body 110 is not particularly limited in view of dimensions, but may have, for example, a size of 0.6 mm×0.3 mm and may be a highly stacked and high-capacitance multilayer ceramic capacitor of 1.0 μF or more.

According to the exemplary embodiment, a raw material forming the dielectric layer 111 may be barium titanate ($BaTiO_3$) powder, but is not limited thereto. In addition, a ceramic additive, an organic solvent, a plasticizer, a binder, a dispersant, or the like, may be added thereto.

The first internal electrodes 121 and the second internal electrodes 122 may be formed of a conductive paste formed of one or more of copper (Cu), nickel (Ni), silver (Ag), and silver-palladium (Ag—Pd).

The first and second external electrodes 131 and 132 may cover both respective end surfaces of the ceramic body 110 and be electrically connected to the first internal electrodes 121 and second internal electrodes 122 exposed to the respective end surfaces of the ceramic body 110.

The first and second external electrodes 121 and 122 may be formed by applying a conductive paste to both ends of the ceramic body 110, and a main ingredient of the conductive paste may include a metal such as copper (Cu), glass, an organic material, or the like.

According to the exemplary embodiment in the present disclosure, the ceramic body 110 may include an active region "$L_a$" that includes a plurality of first dielectric layers 111a and the first internal electrodes 121 and the second internal electrodes 122 alternately disposed on surfaces of the plurality of first dielectric layers 111a to contribute to capacitance formation, and a protective layer "$L_c$" provided on at least one of upper and lower surfaces of the active region $L_a$, wherein at least one second dielectric layer 111b to which a step portion absorbing layer 112 is disposed at both end portions is inserted into the active region $L_a$.

The ceramic body 110 may be formed by stacking the plurality of dielectric layers 111 in the thickness direction.

More specifically, the ceramic body 110 can have active region $L_a$ in which the plurality of dielectric layers 111 are stacked in the thickness direction and the first internal electrodes 121 and the second internal electrodes 122 are alternately stacked while facing the dielectric layers, to contribute to capacitance formation of the capacitor, and can have protective layer $L_c$ provided on at least one of the upper and lower surfaces of the active region $L_a$, as illustrated in FIG. 2.

A thickness of a single first dielectric layer 111a disposed in the active region $L_a$ may be optionally changed depending on a capacitance design of the multilayer ceramic capacitor, but according to the exemplary embodiment in the present disclosure, a thickness of a single dielectric layer may be 1.0 μm or less after sintering.

A plurality of first and second internal electrodes 121 and 122 may be disposed in the active region $L_a$ of the ceramic body 110.

The first internal electrodes 121 and the second internal electrodes 122 may respectively be formed on ceramic green sheets forming the first dielectric layers 111a, stacked, and sintered to thereby be formed in the ceramic body 110, with respective dielectric layers interposed therebetween.

The internal electrodes may be composed of the first internal electrodes 121 and the second internal electrodes 122 having different polarities from each other in pairs, and be disposed to face each other in the stacking direction with respective first dielectric layers 111a interposed therebetween, disposed in the active region $L_a$.

Terminals of the first internal electrodes 121 and the second internal electrodes 122 may be exposed to both respective end surfaces of the ceramic body 110 in the length direction.

In the present specification, a region of the dielectric layer in which the internal electrodes are not formed is referred to as a margin portion.

As illustrated in FIG. 2, a margin portion formed in the width (W) direction of the ceramic capacitor may be referred to as a widthwise margin portion $M_W$, and as described below, a margin portion formed in the length (L) direction of the ceramic capacitor illustrated in FIG. 4 may be referred to as a lengthwise margin portion $M_L$.

A single dielectric layer 111 may have a lengthwise margin portion $M_L$ on which first or second internal electrodes 121 or 122 are not formed in the length (L) direction and a widthwise margin portion $M_W$ on which the first or second internal electrodes 121 or 122 are not formed in the width (W) direction.

A thickness of the first internal electrodes 121 and the second internal electrodes 122 may be appropriately determined depending on the use, or the like. For example, the thickness of the first internal electrodes 121 and the second internal electrodes 122 may be 1.0 μm or less.

According to the exemplary embodiment in the present disclosure, the dielectric layer constituting the ceramic body 110 may contain ceramic powder generally used in the art. Although not limited thereto, the dielectric layer may contain, for example, a $BaTiO_3$-based ceramic powder. Examples of such a $BaTiO_3$-based ceramic powder may include $(Ba_{1-x}Ca_x)TiO_3$, $Ba(Ti_{1-y}Ca_y)O_3$, $(Ba_{1-x}Ca_x)(Ti_{1-y}Zr_y)O_3$, or $Ba(Ti_{1-y}Zr_y)O_3$ in which Ca, Zr, or the like, is partially solid-dissolved in $BaTiO_3$, but are not limited thereto. An average particle size of the ceramic powder may be, for example, 0.8 μm or less, preferably, 0.05 to 0.5 μm, but is not limited thereto.

In addition, the dielectric layer may contain, for example, a transition metal oxide or carbide, a rate earth element, Mg, Al, and the like, in addition to the ceramic powder.

According to the exemplary embodiment, at least one second dielectric layer 111b to which the step portion absorption layer 112 is disposed at both end portions may be in the active region La.

That is, the active region $L_a$ may have a structure in which the second dielectric layer 111b to which the step portion absorption layer 112 is disposed at both end portions is between the plurality of first dielectric layers 111a alternately stacked with the first internal electrodes 121 and the second internal electrodes 122. The structure may be implemented by stacking a plurality of first ceramic green sheets and stacking a second ceramic green sheet thereon as described below, wherein the first ceramic green sheets have a conductive metal paste applied thereto to become the first internal electrodes 121 and the second internal electrodes 122 after sintering, and the second ceramic green sheet has both end portions on which the step portion absorption layer is formed by forming a ceramic member.

As the number of stacked ceramic green sheets has increased, a problem affecting product reliability may occur when the ceramic green sheets are stacked and compressed.

The ceramic green sheet is composed of an internal electrode formation portion and a margin portion, an internal electrode non-formation portion. When the ceramic green sheets are compressed after stacking, a step portion between the internal electrode formation portion and the margin portion may be increased, which can deteriorate withstand voltage characteristics.

In order to solve the step portion problem as described above, a method of adding a separate ceramic material to a margin portion of a ceramic body using a negative printing method has been used. However, it can be significantly difficult to print separate ceramic slurry on the margin portion in the ceramic green sheet.

Furthermore, the negative printing method does not have a high precision and thus may not sufficiently decrease the step portion when there is an alignment defect of the ceramic green sheet after stacking.

The negative printing method can result in an increased manufacturing cost, an increased defect rate due to a high degree of difficulty in the method itself, and difficultly in implementing a precise product.

In contrast, according to the exemplary embodiment, the step portion problem may be addressed by having an active region $L_a$ with a second dielectric layer 111b, to which the step portion absorption layer 112 is disposed at both end portions, between the plurality of first dielectric layers 111a alternately stacked with the first and second internal electrodes 121 and 122, thereby resulting in a high capacitance multilayer ceramic electronic component with improved withstand voltage characteristics.

Both end portions may be regions corresponding to the margin portions $M_W$ and/or $M_L$ of the active region $L_a$.

That is, the active region $L_a$ contributing to capacitance formation may have a structure in which at least one second dielectric layer 111b to which the step portion absorption layer 112 is disposed in the margin portions $M_W$ and $M_L$, corresponding to the internal electrode non-formation portions, and separately from the plurality of first dielectric layers 111a alternately stacked with the first and second internal electrodes 121 and 122.

According to the exemplary embodiment in the present disclosure, since at least one second dielectric layer 111b on which the step portion absorption layer 112 is disposed in the margin portions $M_W$ and $M_L$ is alternately stacked, separately from the plurality of first dielectric layers 111a alternately stacked with the first and second internal electrodes 121 and 122, the process may be relatively easy compared to the negative printing method using a separate ceramic material, and an alignment defect of the ceramic green sheet may be avoided, such that the effect of decreasing the step portion may be excellent.

According to the exemplary embodiment in the present disclosure, a total thickness "$t_1$" of adjacent dielectric layers disposed in region in which a step portion absorption layer 112 is disposed may be greater than a thickness "$t_2$" of a dielectric layer disposed in another region.

The thickness of the dielectric layer may be measured at points at which a first internal electrode 121 and a second internal electrode 122 face each other in the active region $L_a$ of the ceramic body 110.

Referring to FIG. 2, the total thickness "$t_1$" of the dielectric layers disposed at the region in which the step portion absorption layer 112 is disposed, that is, the dielectric layers disposed on the same plane as a step portion absorption layer 112, may be measured at points at which the first internal electrode 121 and the second internal electrode 122 face each other.

The thickness $t_2$ of the dielectric layer disposed in another region, that is, not on the same plane as a step portion absorption layer 112, may be measured at points at which a first internal electrode 121 and a second internal electrode 122 face each other.

Since at least one second dielectric layer 111b to which the step portion absorption layer 112 is disposed in the margin portions $M_W$ and $M_L$ is alternately stacked, separately from the plurality of the first dielectric layers 111a alternately stacked with the first and second internal electrodes 121 and 122, a structure in which the total thickness $t_1$ of the dielectric layers disposed on the region in which the step portion absorption layer 112 is disposed is greater than the thickness t2 of the dielectric layer disposed in another region may be implemented.

That is, since at least two dielectric layers are disposed on the same plane as a step portion absorption layer 112, unlike a dielectric layer disposed in another position, the total thickness $t_1$ of the dielectric layers disposed at the region in which the step portion absorption layer 112 is disposed may be greater than the thickness t2 of other dielectric layer.

Referring to FIG. 2, the step portion absorption layer 112 may be disposed in a region corresponding to the margin portion $M_W$ of the active region $L_a$ in the width direction of the ceramic body 110. Referring to FIG. 4, the step portion absorption layer 112 may be disposed in a region corresponding to the margin portion $M_L$ of the active region La in the length direction of the ceramic body 110.

The step portion may be disposed in both of the regions corresponding to the margin portions $M_W$ and the $M_L$ of the active region $L_a$ in the width and length directions of the ceramic body.

In addition, the step portion absorption layer 112 may only be disposed in one of the margin portions $M_W$ or $M_L$.

Referring to FIGS. 2 and 3, one surface of a second dielectric layer 111b may come into contact with the first or second internal electrode 121 or 122, and the other surface thereof may come into contact with a first dielectric layer 111a.

Since the active region $L_a$ is formed by repeating a method of stacking a plurality of first ceramic green sheets, stacking a second ceramic green sheet thereon, and stacking a plurality of first ceramic green sheets thereon, the first ceramic green sheets being applied with the conductive metal paste to become the first internal electrode 121 and the second internal electrode 122 after sintering, and the second ceramic green sheet having both end portions on which the step portion absorption layer is formed by forming the ceramic member, one surface of the second dielectric layer 111b may come into contact with the first or second internal electrodes 121 or 122, and the other surface thereof may come into contact with the first dielectric layer 111a.

Further, two or more first dielectric layers 111a may be stacked on at least one of upper and lower surfaces of the second dielectric layer 111b.

That is, the active region $L_a$ may be formed by repeating a structure in which two or more first dielectric layers 111a are stacked and the second dielectric layer 111b is stacked thereon.

The amount of first dielectric layers 111a disposed on at least one of the upper and lower surfaces of the second dielectric layer 111b may be three or more.

According to the exemplary embodiment in the present disclosure, when two or more first dielectric layers 111a on which the first internal electrode 121 and the second internal electrode 122 are disposed are considered as one unit, the second dielectric layer 111b may be disposed between one unit composed of two or more first dielectric layers 111a and another unit adjacent thereto.

The number of second dielectric layers 111b on which the step portion absorption layer 112 is disposed in the lengthwise and/or widthwise margin portions $M_W$ and/or $M_L$ of the ceramic body 110 is not particularly limited as long as the step portion generated by the stacked internal electrodes may be offset.

The thickness of the step portion absorption layer 112 is not particularly limited. For example, the step portion absorption layer 112 may have a thickness at which the step portion generated by the stacked internal electrodes may be offset.

The number of dielectric grains in the dielectric layers disposed at the side portion of the region in which the step portion absorption layer 112 is disposed may be greater than that in the dielectric layer disposed in another region.

Since at least two dielectric layers are disposed at the region in which the step portion absorption layer 112 is disposed, unlike other dielectric layers, the number of dielectric grains may be larger than that in other dielectric layers.

According to the exemplary embodiment in the present disclosure, a thickness "$t_b$" of the step portion absorption layer 112 may be greater than 10 to 20 times a thickness "$t_d$" of each of the first dielectric layers 111a.

The step portion absorption layer 112 may be formed to have a thickness $t_b$ greater than 10 to 20 times the thickness $t_d$ of each of the first dielectric layers 111a, such that the step portion generated by the stacked internal electrodes may be offset, and the withstand voltage characteristics may be improved.

For example, where the thickness $t_d$ of each of the first dielectric layers 111a are 0.4 μm, the thickness $t_b$ of the step portion absorption layer 112 may be 4 to 8 μm.

According to the exemplary embodiment in the present disclosure, in the stacking direction of the first internal electrodes 121 and the second internal electrodes 122, end portions of two internal electrodes adjacent to the step portion absorption layer 112 among the first internal electrode 121 and the second internal electrode 122 may be bent in directions away from the adjacent step portion absorption layer 112.

The directions in which the end portions of two internal electrodes adjacent to the step portion absorption layer 112 are distant from the adjacent step portion absorption layer 112 may mean the directions away from the step portion absorption layer 112 as illustrated in FIGS. 2 and 3, in the stacking direction of the internal electrodes or dielectric layers, that is, the thickness direction of the ceramic body 110.

That is, the step portion absorption layer 112 having a thickness greater than 10 to 20 times the thickness of the first dielectric layer 111a may be disposed in the lengthwise and/or widthwise margin portion $M_W$ and/or $M_L$ of the ceramic body 110, such that the end portions of two internal electrodes adjacent to the step portion absorption layer 112 may be bent due to the presence of the step portion absorption layer 112 during the compressing.

The bent end portions of the internal electrodes may be bent in the direction away from the adjacent step portion absorption layer 112 due to the presence of the step portion absorption layer 112.

A bend angle "θ" of the end portions of two internal electrodes 121 and 122 adjacent to the step portion absorption layer 112 may be between 3 to 15 degrees, based on a stacking surface of the dielectric layer 111.

The internal electrodes of which the end portions are bent at an angle of between 3 to 15 degrees, based on the stacking surface of the dielectric layer 111 may be both of the two internal electrodes 121 and 122 adjacent to the step portion absorption layer 112, but are not limited thereto. That is, only some of the end portions of two internal electrodes 121 and 122 adjacent to the step portion absorption layer 112 may be bent as described above.

The end portions of two internal electrodes 121 and 122 adjacent to the step portion absorption layer 112 may be bent at an angle of between 3 to 15 degrees, based on the stacking surface of the dielectric layer 111, to achieve a multilayer ceramic capacitor simultaneously having excellent withstand voltage characteristics and high capacitance.

The end portions of two internal electrodes 121 and 122 adjacent to the step portion absorption layer 112 may be controlled to be bent at an angle of between 3 to 15 degrees, based on the stacking surface of the dielectric layer 111, such that a designed degree of capacitance may be implemented. In addition, the end portions of the two internal electrodes may be adjusted to have a constant interval therebetween, to prevent defects such as short circuits, or the like, and improve withstand voltage characteristics.

Where the bend angle of the end portions of two internal electrodes 121 and 122 adjacent to the step portion absorption layer 112 is less than 3 degrees, based on the stacking surface of the dielectric layer 111, capacitance may be decreased, such that the high-capacitance multilayer ceramic capacitor may not be implemented.

Meanwhile, where the bend angle of the end portions of two internal electrodes 121 and 122 adjacent to the step portion absorption layer 112 is more than 15 degrees, based on the stacking surface of the dielectric layer 111, the withstand voltage characteristics may be deteriorated.

According to the exemplary embodiment, a distance between two internal electrodes 121 and 122 adjacent to the step portion absorption layer 112 may be greater than a distance between two other internal electrodes.

According to the exemplary embodiment in the present disclosure, since the second dielectric layer 111b on which the step portion absorption layer 112 is disposed is disposed between one unit composed of two or more first dielectric layers 111a and another unit adjacent thereto, the first and second dielectric layers 111a and 111b may be disposed between two internal electrodes 121 and 122 adjacent to the step portion absorption layer 112, and only the first dielectric layer 111a may be disposed between two other internal electrodes.

Therefore, the distance between two internal electrodes 121 and 122 adjacent to the step portion absorption layer 112 may be greater than the distance between two other internal electrodes.

Figure 4:
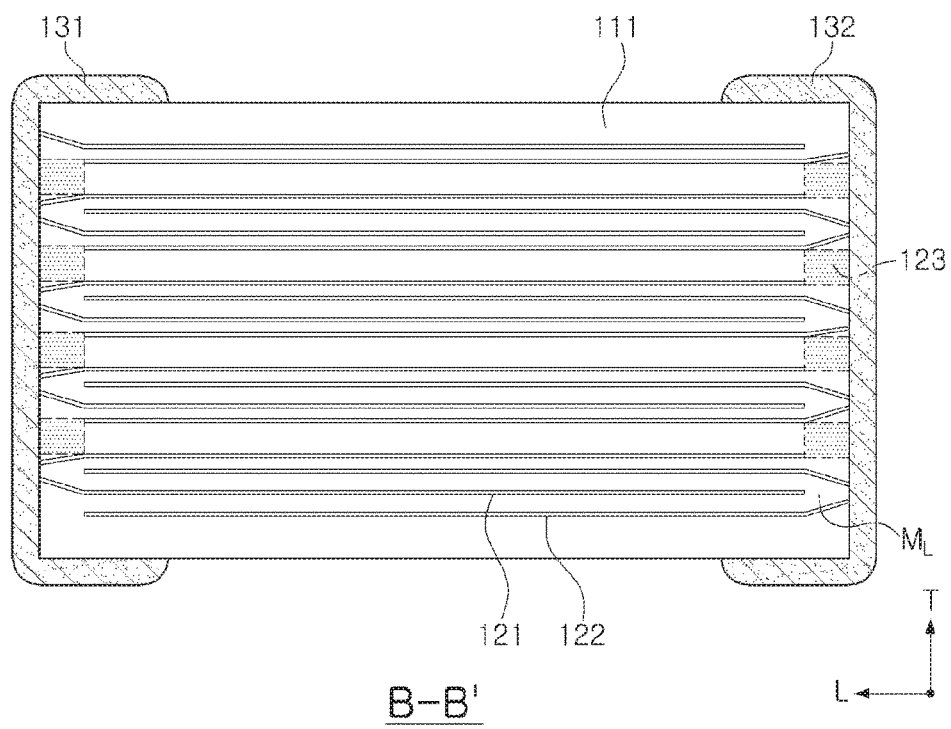
FIG. 4 is a cross-sectional view taken along line B-B' of FIG. 1 in order to illustrate the exemplary embodiment in the present disclosure.

FIG. 4 is a cross-sectional view taken along line B-B' of FIG. 1 in order to illustrate the exemplary embodiment in the present disclosure.

Referring to FIG. 4, the step portion absorption layer 112 may be disposed in the region corresponding to the margin portion $M_L$ of the active region $L_a$ in the length direction of the ceramic body 110.

As described above, the step portion absorption layer 112 may be disposed in the region corresponding to the margin portion $M_L$ of the active region $L_a$ in the length direction of the ceramic body 110, the margin portion $M_W$ thereof in the width direction of the ceramic body 110, or both of the margin portions $M_L$ and $M_W$ thereof in the length and width directions of the ceramic body 110.

Where the step portion absorption layer 112 is disposed in both of the lengthwise and widthwise margin portions $M_L$ and $M_W$ of the ceramic body 110, the step portion absorption layer 112 disposed in the lengthwise margin portion $M_L$ of the ceramic body 110 may be thinner than the step portion absorption layer 112 disposed in the widthwise margin portion $M_W$ of the ceramic body 110.

For example, the thickness of the step portion absorption layer 112 disposed in the lengthwise margin portion $M_L$ of the ceramic body 110 may be half of the thickness of the step portion absorption layer 112 disposed in the widthwise margin portion $M_W$ of the ceramic body 110.

Since the first internal electrode 121 and the second internal electrode 122 are alternately disposed in the lengthwise margin portion $M_L$ of the ceramic body 110, to be respectively exposed to the end portions of the ceramic body, an electrode density in the lengthwise margin portion $M_L$ is higher than that in the widthwise margin portion $M_W$ in which the internal electrodes are not formed, such that a step portion may be significantly increased in the widthwise margin portion $M_W$.

Therefore, in order to significantly decrease an influence of the step portion and improve the withstand voltage characteristics in the overall ceramic body 110, the thickness of the step portion absorption layer 112 disposed in the lengthwise margin portion $M_L$ of the ceramic body 110 in which the electrode density is higher can be less than or equal to half of the thickness of the step portion absorption layer 112 disposed in the widthwise margin portion $M_W$ of the ceramic body 110.

According to another exemplary embodiment in the present disclosure, there is provided a multilayer ceramic electronic component including a ceramic body 110 in which dielectric layers 111 and internal electrodes 121 and 122 are alternately stacked, and external electrodes 131 and 132 electrically connected to the internal electrodes 121 and 122, respectively, and formed on respective ends of the ceramic body 110. The ceramic body 110 includes an active region La contributing to capacitance formation and a protective layer $L_c$ provided on at least one of upper and lower surfaces of the active region $L_a$. There is at least one gap portion 112 disposed in both end portions of the active region $L_a$, and a distance between two internal electrodes 121 and 122 adjacent to the gap portion 112 is greater than a distance between two other internal electrodes.

The gap portion 123 may be defined as a portion formed in a margin portion of the ceramic body due to a step portion absorption layer in a case of forming the ceramic member on both end portions of a second ceramic green sheet to form the step portion absorption layer, inserting the second ceramic green sheet between a plurality of first ceramic green sheets on which an internal electrode pattern is formed using a conductive metal paste, and then stacking, compressing, and sintering the ceramic green sheets according to the exemplary embodiment in the present disclosure.

Since the second ceramic green sheet of which the step portion absorption layer is disposed on both end portions is disposed between one unit composed of two or more first ceramic green sheets and another unit adjacent thereto, end portions of two internal electrode patterns adjacent to the step portion absorption layer may be bent.

The gap portion 123 may be disposed in the margin portions $M_W$ and $M_L$ of the ceramic body 110, in the vicinity of end portions of two internal electrodes bent after sintering.

Since the second ceramic green sheet of which the step portion absorption layer is disposed on both end portions is disposed between one unit composed of two or more first ceramic green sheets and another unit adjacent thereto, the first ceramic green sheet and the second ceramic green sheet may be disposed between two internal electrode patterns adjacent to the step portion absorption layer, and only the first ceramic green sheet may be disposed between other two internal electrode patterns.

A distance between two internal electrodes 121 and 122 adjacent to the gap portion 123 after sintering may be greater than a distance between two other internal electrodes.

Since the gap portion 123 is disposed in the vicinity of the bent end portions of two internal electrodes, a distance between the end portions of two internal electrodes 121 and 122 adjacent to the gap portion 123 may be greater than a distance between end portions of two other internal electrodes.

A difference between a distance between two internal electrodes 121 and 122 adjacent to the gap portion 123 and a distance between two other internal electrodes may be greater in a central portion of the ceramic body 110 than that in end portions of the ceramic body 110.

The reason is that in the margin portions $M_W$ and $M_L$ of the ceramic body 110 after sintering, the gap portion 123 is disposed in the vicinity of the bent end portions of two internal electrodes.

Since other features are the same as those of the multilayer ceramic electronic component according to the exemplary embodiment in the present disclosure described above, a detailed description thereof will be omitted.

According to another exemplary embodiment in the present disclosure, there is provided a multilayer ceramic electronic component including a ceramic body 110 in which dielectric layers 111 and internal electrodes 121 and 122 are alternately stacked, and external electrodes 131 and 132 electrically connected to the internal electrodes 121 and 122, respectively, and formed on respective ends of the ceramic body 110. The ceramic body 110 includes an active region $L_a$ contributing to capacitance formation and a protective layer $L_c$ provided on at least one of upper and lower surfaces of the active region $L_a$, at least one gap portion 112 is disposed in both end portions of the active region $L_a$. Two internal electrodes 121 and 122 adjacent to the gap portion 112 are bent in directions away from the gap portion 112 in a stacking direction of the internal electrodes, that is, a thickness direction of the ceramic body 110.

Since other features are the same as those of the multilayer ceramic electronic component according to the exemplary embodiment in the present disclosure described above, a detailed description thereof will be omitted.

Figure 5:
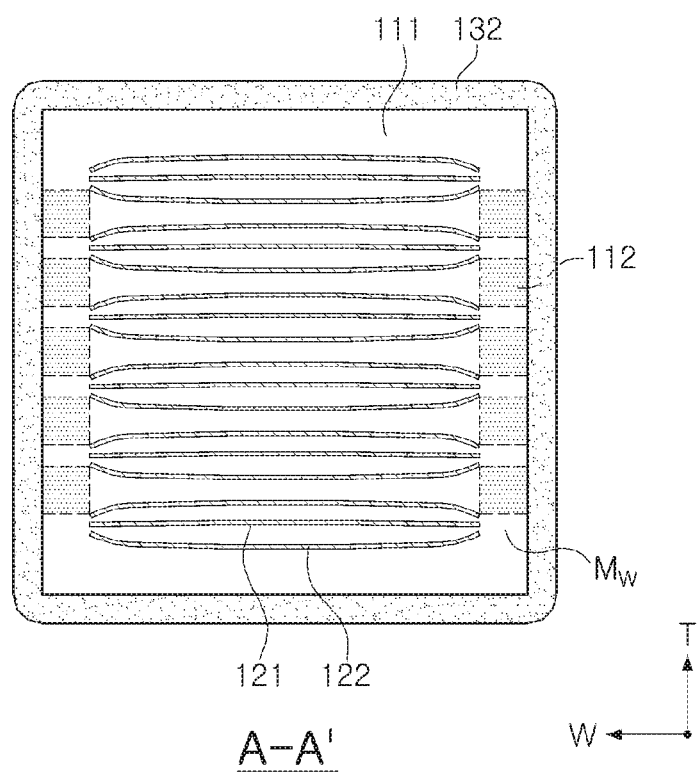
FIG. 5 is a cross-sectional view taken along line A-A' of FIG. 1 in order to illustrate another exemplary embodiment in the present disclosure.

FIG. 5 is a cross-sectional view taken along line A-A' of FIG. 1 in order to illustrate another exemplary embodiment in the present disclosure.

Referring to FIG. 5, in a multilayer ceramic capacitor according to another exemplary embodiment in the present disclosure, first and second internal electrodes 121 and 122 may be compressed during a manufacturing process to thereby have a smoothly curved shape.

Further, two internal electrodes 121 and 122 adjacent to a gap portion 123 may be bent in directions away from the gap portion 123 in a stacking direction of the internal electrodes, that is, a thickness direction of the ceramic body 110.

Figure 6:
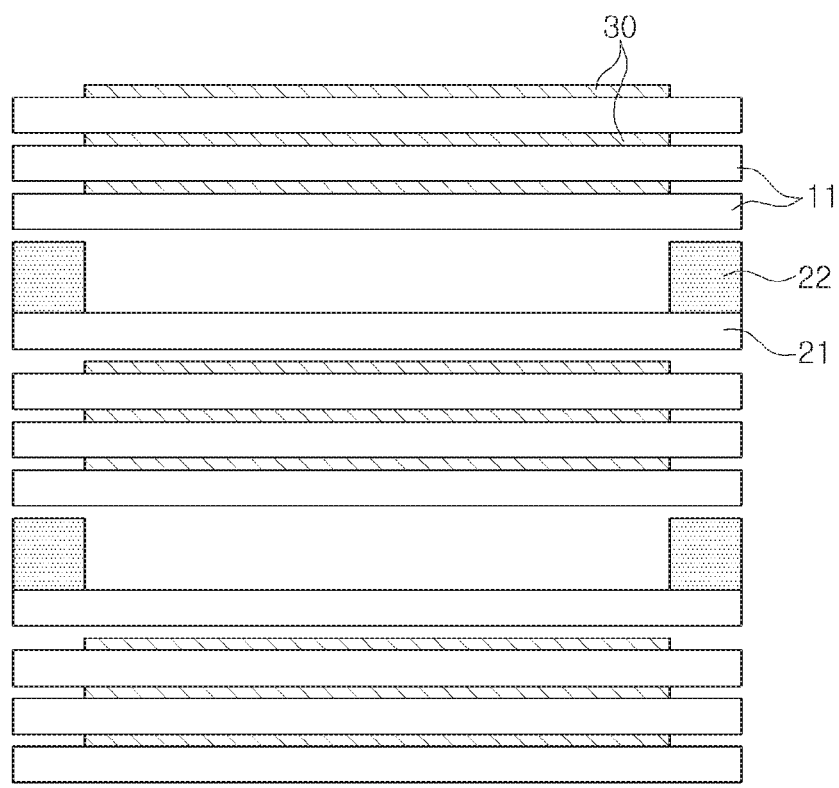
FIG. 6 is a cross-sectional view illustrating a stack structure of the multilayer ceramic capacitor according to the exemplary embodiment in the present disclosure.

FIG. 6 is a cross-sectional view illustrating a stack structure of the multilayer ceramic capacitor according to the exemplary embodiment in the present disclosure.

Referring to FIG. 6, the multilayer ceramic capacitor according to the exemplary embodiment in the present disclosure may include the active region $L_a$ formed by stacking a plurality of first ceramic green sheets 11, stacking a second ceramic green sheet 21 thereon, and stacking a plurality of first ceramic green sheets 11 thereon, and contributing to capacitance formation, wherein an internal electrode pattern 30 to become first and second internal electrodes after sintering is formed on the first ceramic green sheets 11 using a conductive metal paste, and the second ceramic green sheet 21 has both end portions on which the step portion absorption layer is formed by forming a ceramic member 22.

Since the active region $L_a$ is formed as described above, one surface of the second ceramic green sheet 21 may come into contact with the internal electrode pattern 30 to become the first or second internal electrode 121 or 122 after sintering, and the other surface thereof may come into contact with the first ceramic green sheet 11.

The first ceramic green sheet 11 may become the first dielectric layer 111a after sintering, and the second ceramic green sheet 21 may become the second dielectric layer 111b after sintering.

Since the second ceramic green sheet 21 with ceramic member 22 on both end portions is disposed between one unit composed of two or more first ceramic green sheets 11 and another unit adjacent thereto, the first and second ceramic green sheets 11 and 21 may be disposed between two internal electrode patterns 30 adjacent to the step portion absorption layer, and only the first ceramic green sheet 11 may be disposed between other two internal electrode patterns.

The distance between two internal electrodes 121 and 122 adjacent to the step portion absorption layer 112 after sintering may be greater than the distance between two other internal electrodes.

A method of forming the ceramic member 22 on both end portions of the second ceramic green sheet 21 is not particularly limited. For example, the ceramic member 22 may be formed by a printing method or a punching method.

FIGS. 7A through 7E are process views illustrating a method of manufacturing a multilayer ceramic capacitor according to another exemplary embodiment in the present disclosure.

Referring to FIGS. 7A through 7E, the method of manufacturing a multilayer ceramic capacitor according to another exemplary embodiment in the present disclosure may include preparing first and second ceramic green sheets 11 and 21; forming an internal electrode pattern 30 on the first ceramic green sheet 11 using a conductive metal paste; forming a ceramic member 22 on both end portions of the second ceramic green sheet 21 to forma step portion absorption layer; stacking the first and second ceramic green sheets 11 and 22 to form a ceramic body including dielectric layers and first and second internal electrodes; and forming first and second external electrodes electrically connected to the first and second internal electrodes, respectively.

The ceramic body may include an active region contributing to capacitance formation and a protective layer provided on at least one of upper and lower surfaces of the active region, wherein the active region is formed by repeating the stacking of at least two first ceramic green sheets 11 and the stacking of the second ceramic green sheet 21 thereon.

In the method of manufacturing a multilayer ceramic capacitor according to another exemplary embodiment in the present disclosure, first, the first ceramic green sheet 11 and the second ceramic green sheet 21 may be prepared.

The first ceramic green sheet 11 may be the same as a ceramic green sheet used in a general multilayer ceramic capacitor, and be manufactured in a sheet form having a thickness of several μm by mixing ceramic powder, a binder, and a solvent to prepare a slurry, and applying the slurry using a doctor blade method.

The slurry may be a ceramic green sheet slurry forming some of the dielectric layers of the active region of the ceramic body and the dielectric layer configuring the protective layer.

The second ceramic green sheet 21 may be equal to the first ceramic green sheet 11 except that the step portion absorption layer is formed by forming the ceramic member 22 on both end portions thereof, thereby being referred to as a different ceramic green sheet.

The ceramic member 22 may be a form of slurry in which the ceramic powder, the binder, and the solvent are mixed with each other similarly to the first ceramic green sheet 11, but contents of the binder and the solvent may be different to those of the binder and the solvent in the slurry forming the first ceramic green sheet 11.

Next, the internal electrode pattern 30 may be formed by applying the conductive metal paste to the first ceramic green sheet 11.

The internal electrode pattern 30 may be formed by a screen printing method or a gravure printing method.

Figure 7A:
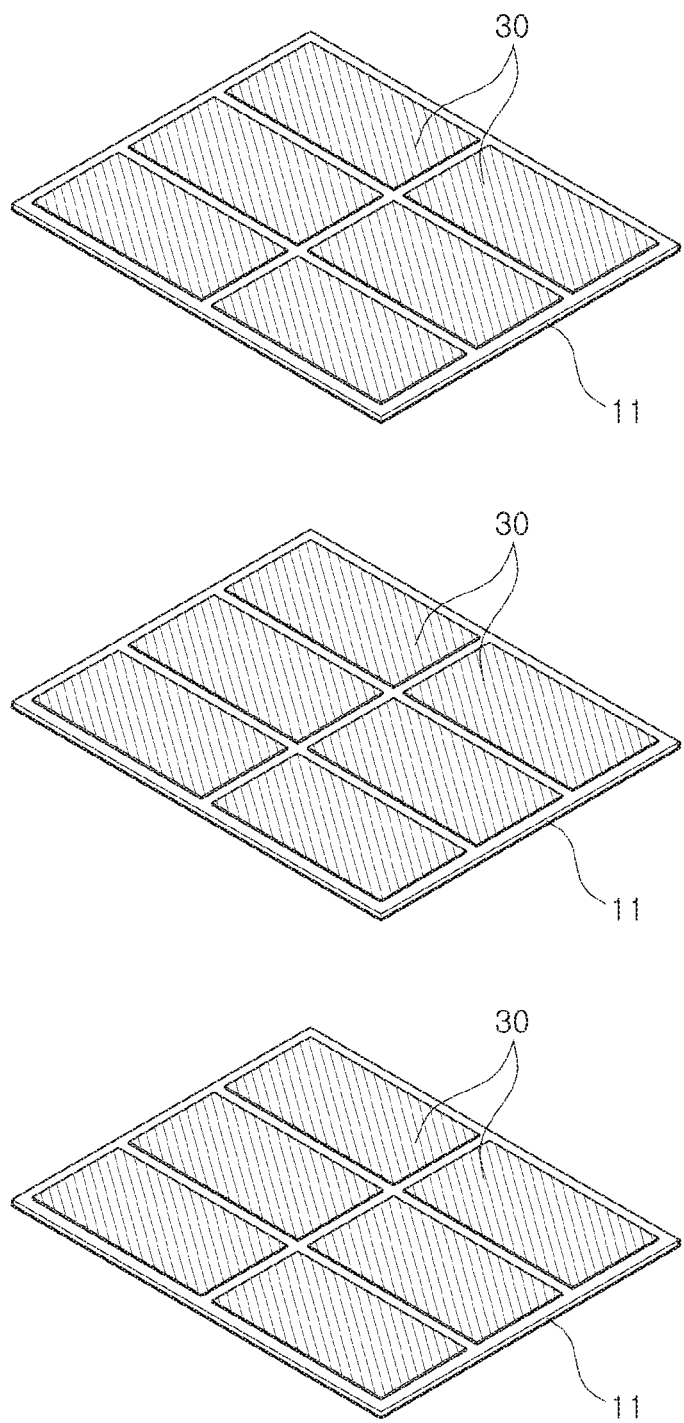
FIGS. 7A through 7E are process views illustrating a method of manufacturing a multilayer ceramic capacitor according to another exemplary embodiment in the present disclosure.

Referring to FIG. 7A, three first ceramic green sheets 11 on which the internal electrode pattern 30 is formed by applying the conductive metal paste thereto are illustrated and represented as one unit, and this unit may be manufactured in plural. In addition, the number of first ceramic green sheets 11 forming one unit is not limited, but may be, for example, two or more.

Thereafter, the step portion absorption layer may be formed by forming the ceramic member 22 on both end portions of the second ceramic green sheet 21.

Figure 7B:
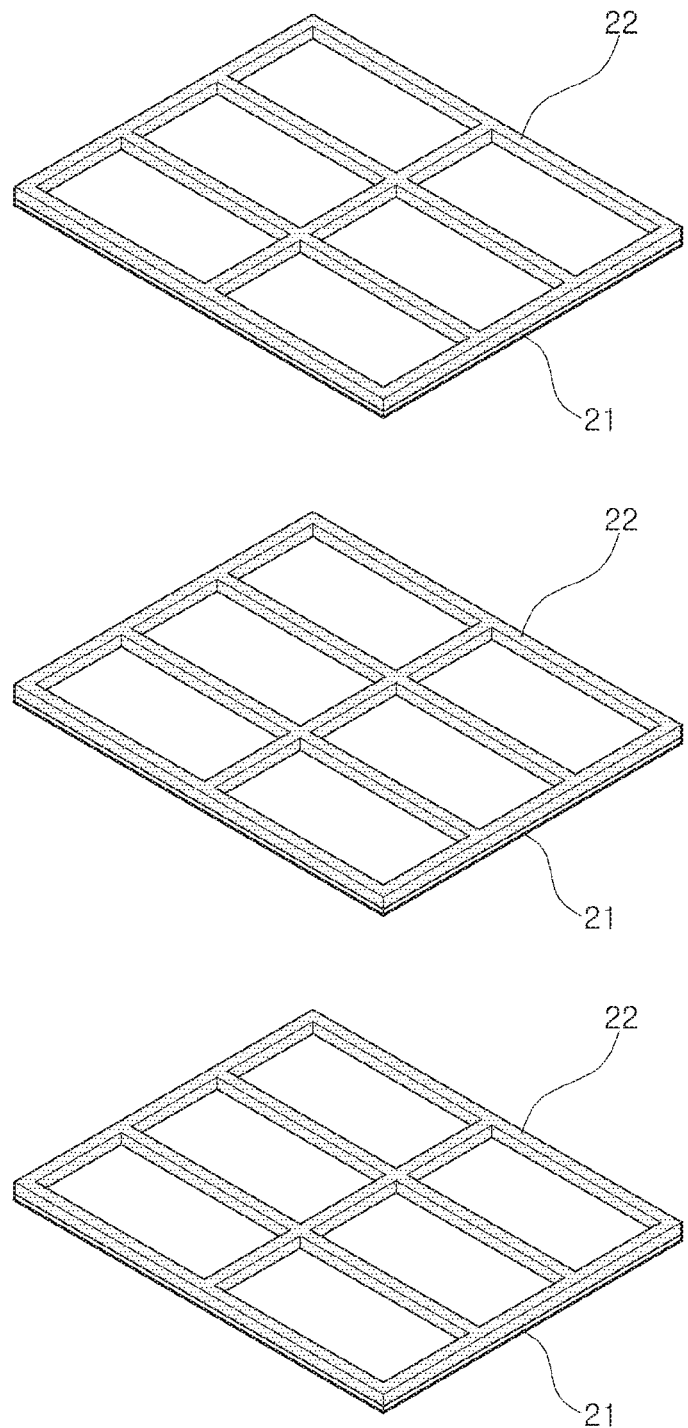

Referring to FIG. 7B, although three second ceramic green sheets 21 of which the step portion absorption layer is formed by forming the ceramic member 22 on both end portions are illustrated, the number of second ceramic green sheets 21 is not limited thereto. That is, the second ceramic green sheets 21 may be manufactured in plural.

A method of forming the ceramic member 22 on both end portions of the second ceramic green sheet 21 is not particularly limited. For example, the ceramic member 22 may be formed by the printing method or the punching method.

Figure 7C:
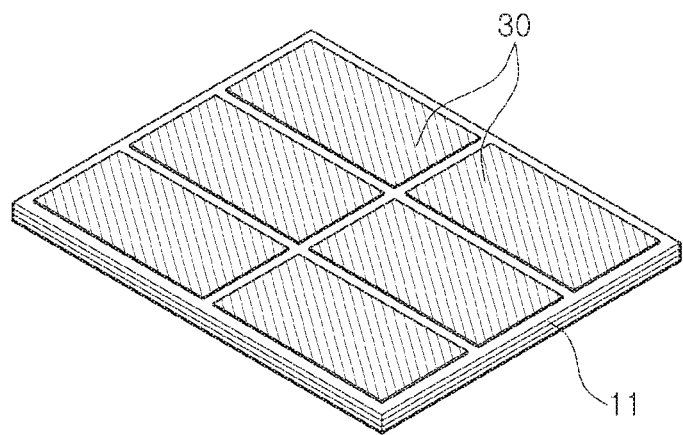

Referring to FIG. 7C, a plurality of first ceramic green sheets 11 on which the internal electrode pattern 30 is formed by applying the conductive metal paste may be stacked.

Although three stacked first ceramic green sheets 11 are illustrated in FIG. 7C, the number of stacked first ceramic green sheets is not limited thereto.

Figure 7D:
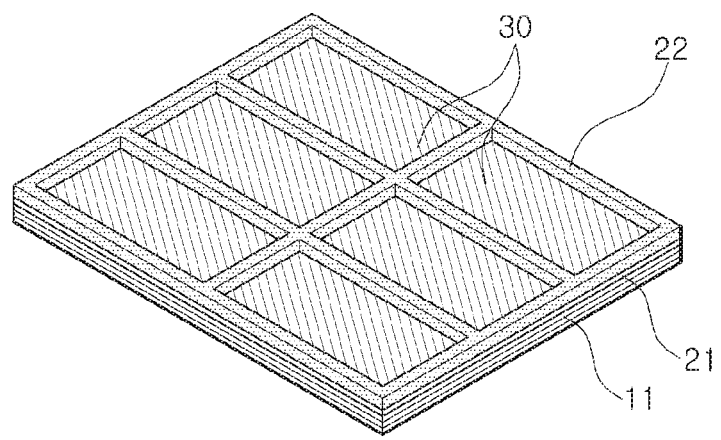

Referring to FIG. 7D, the second ceramic green sheet 21 on which the step portion absorption layer is formed may be stacked on the stacked first ceramic green sheets 11 corresponding to one unit.

The step portion absorption layer may be formed in a region of the second ceramic green sheet 21 corresponding to a portion of the first ceramic green sheet 11 on which the conductive metal paste is not applied, that is, a portion to become a margin portion of the ceramic body after sintering.

Although the step portion absorption layer is illustrated in FIG. 7D as being formed in all regions corresponding to lengthwise and widthwise margin portions of the ceramic body after sintering, the step portion absorption layer is not limited thereto. That is, the step portion absorption layer may only be formed in the lengthwise margin portion or the widthwise margin region.

Next, a plurality of first ceramic green sheets 11 on which the internal electrode pattern 30 is formed through the conductive metal paste being applied thereto may be stacked on the second ceramic green sheet 21.

Figure 7E:
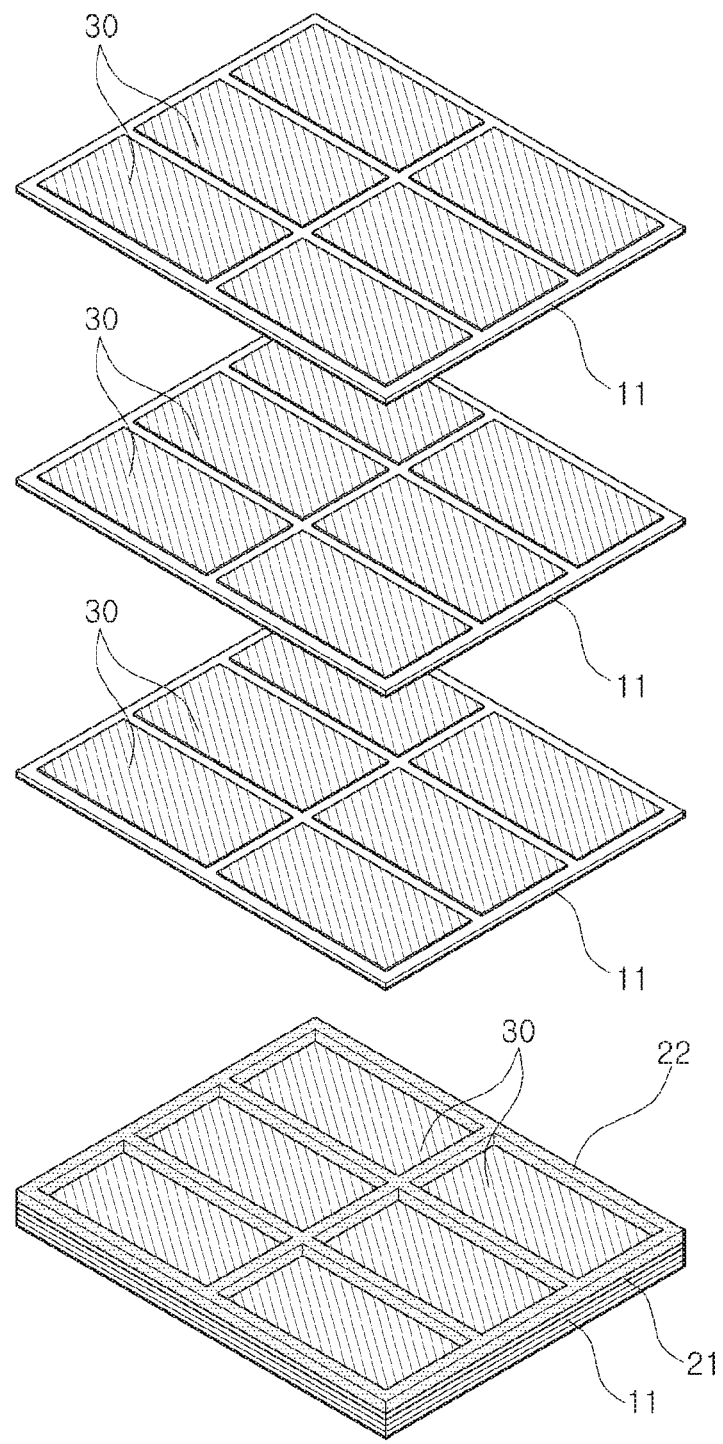
Figure 8A:
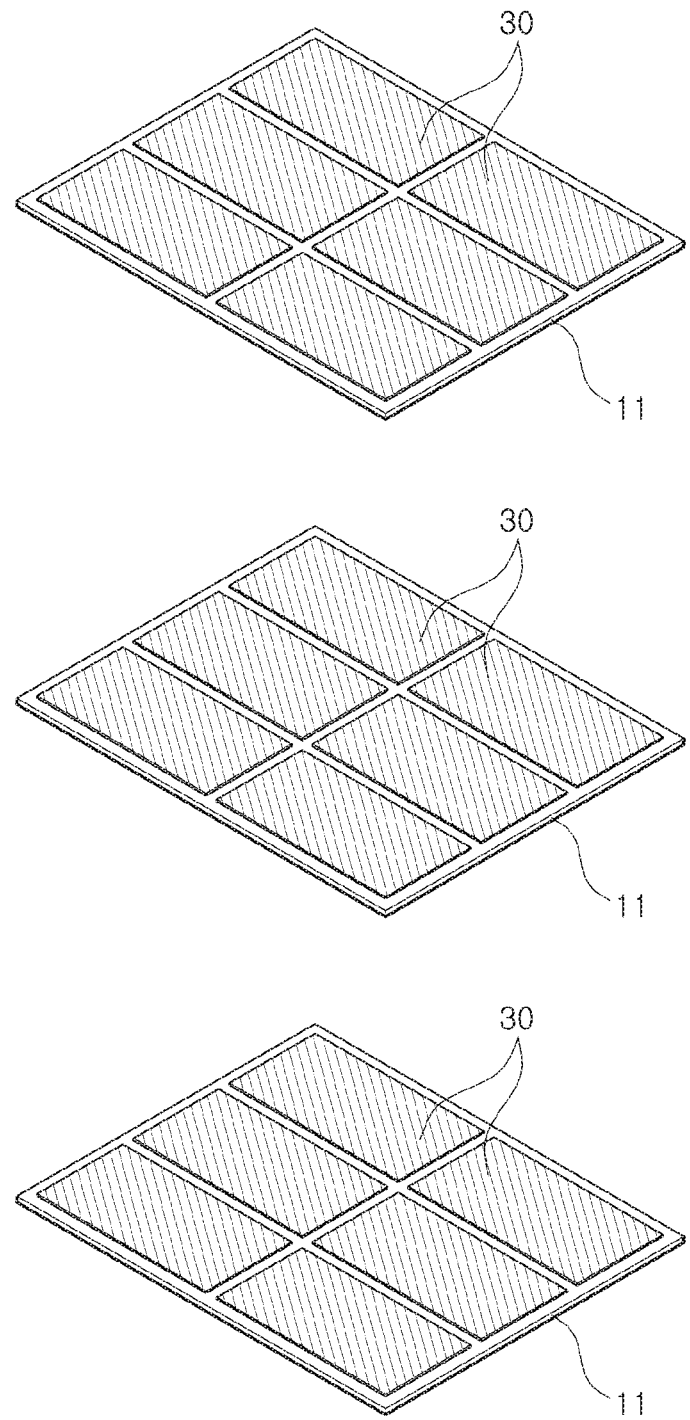
FIGS. 8A through 8E are process views illustrating a method of manufacturing a multilayer ceramic capacitor according to another exemplary embodiment in the present disclosure.
Figure 8B:
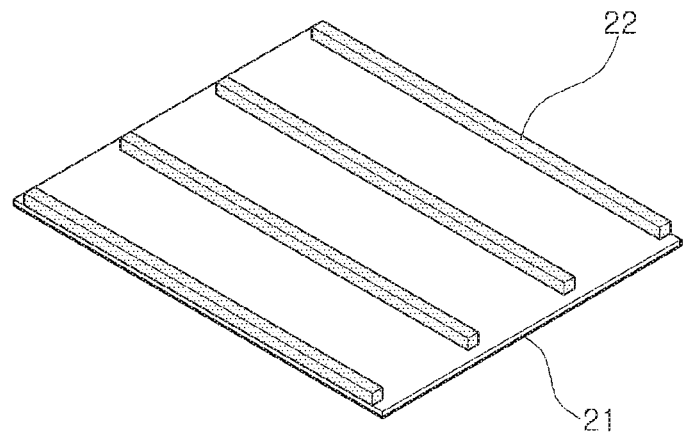
Figure 8B:
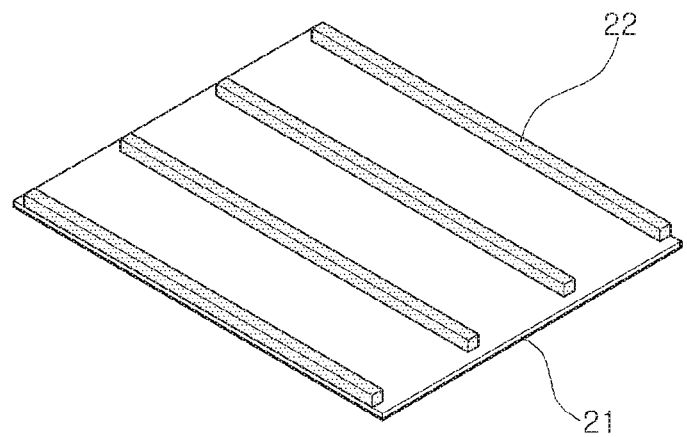
Figure 8B:
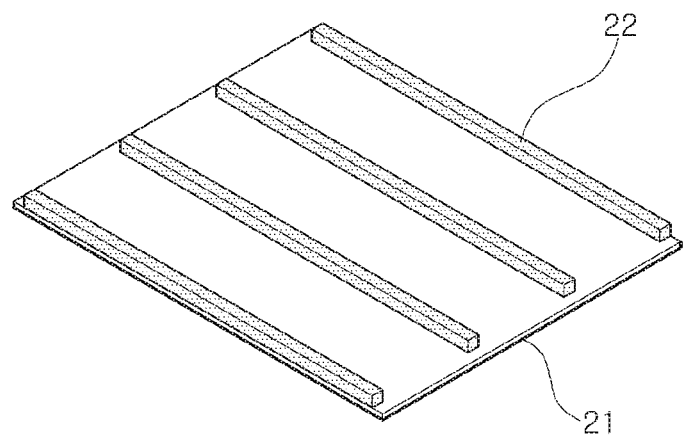
Figure 8C:
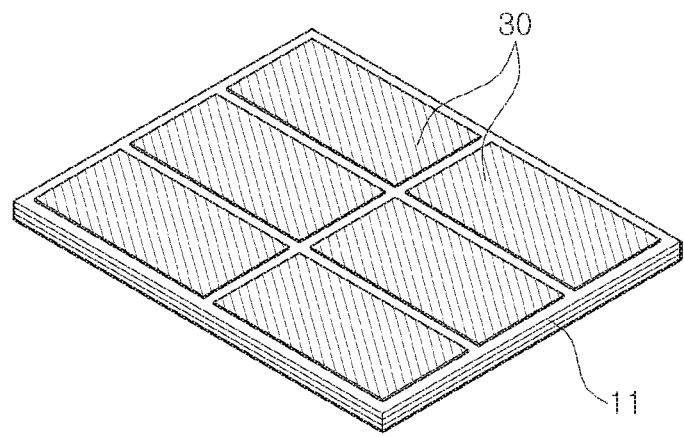
Figure 8D:
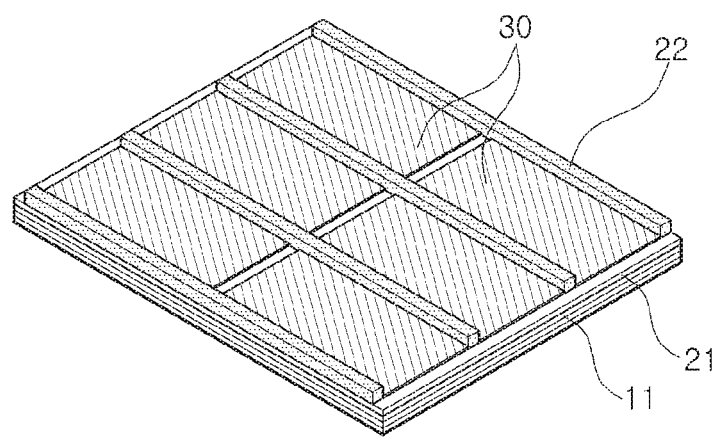
Figure 8E:
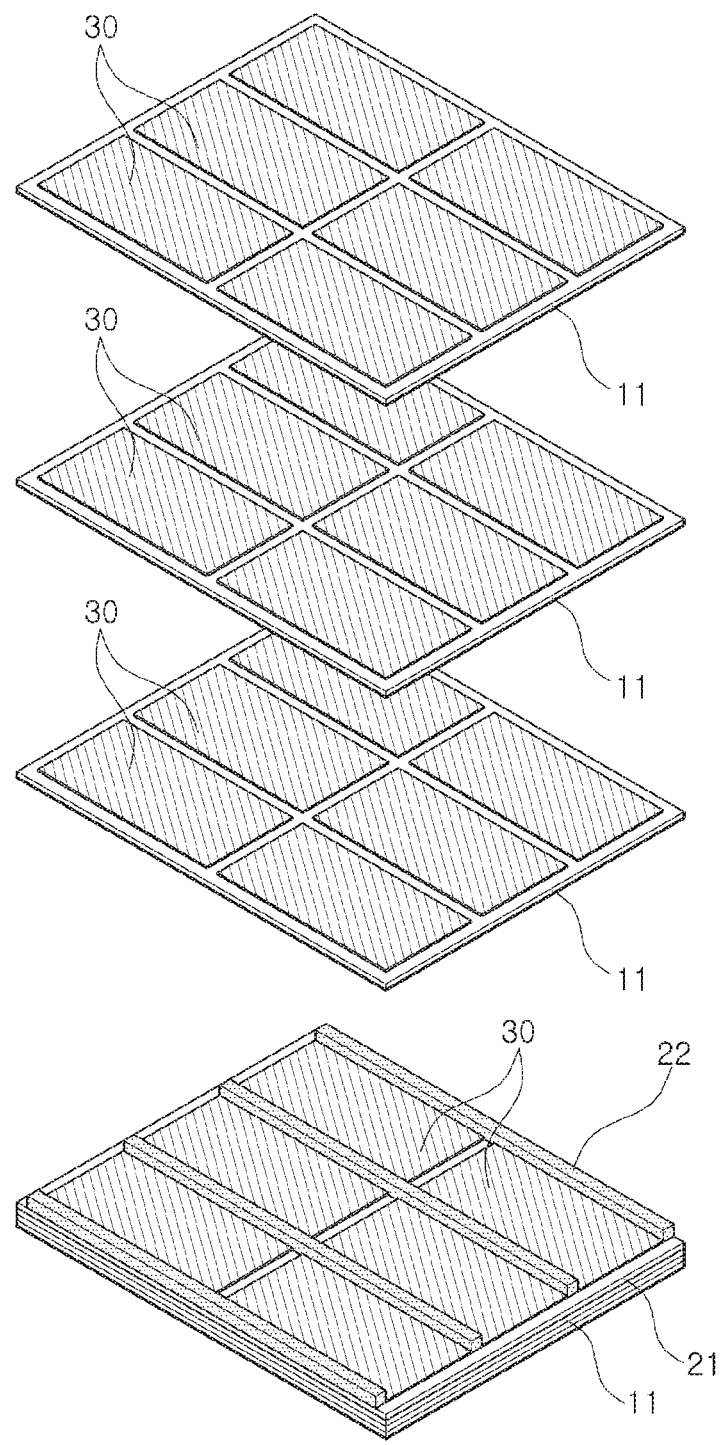
Figure 9A:
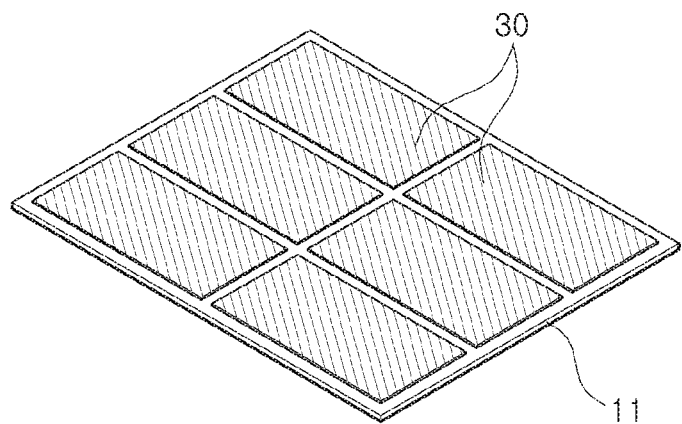
FIGS. 9A through 9E are process views illustrating a method of manufacturing a multilayer ceramic capacitor according to another exemplary embodiment in the present disclosure.
Figure 9A:
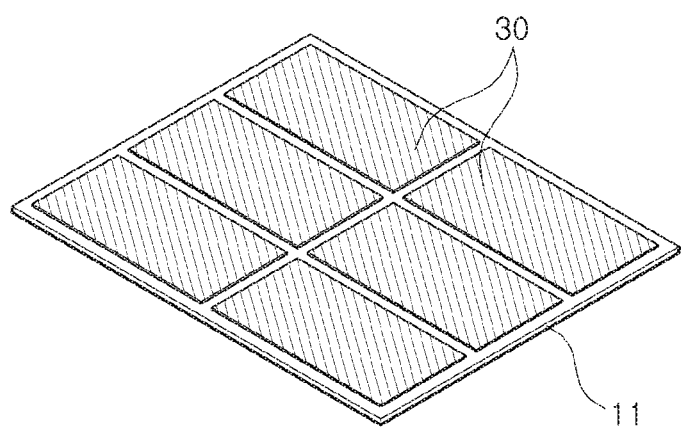
Figure 9A:
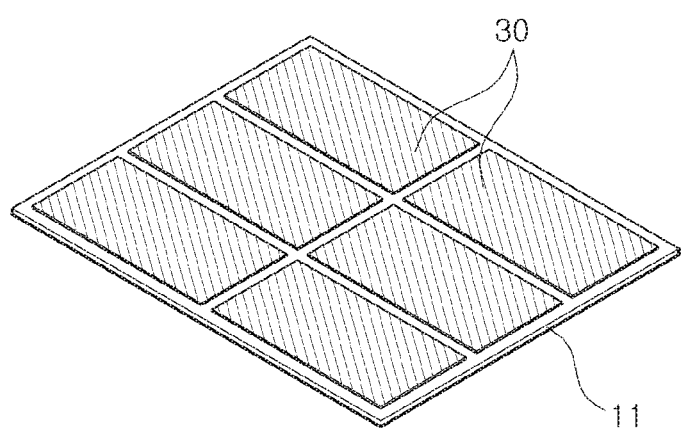
Figure 9B:
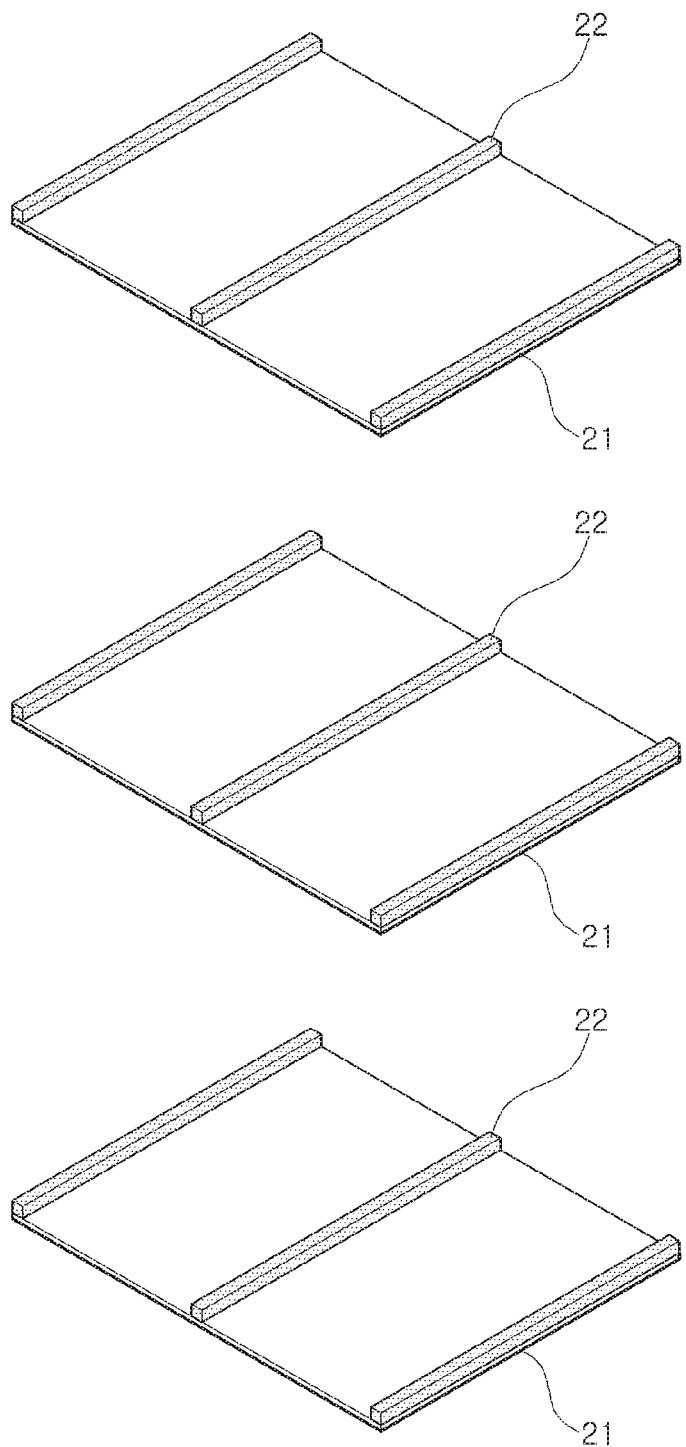
Figure 9C:
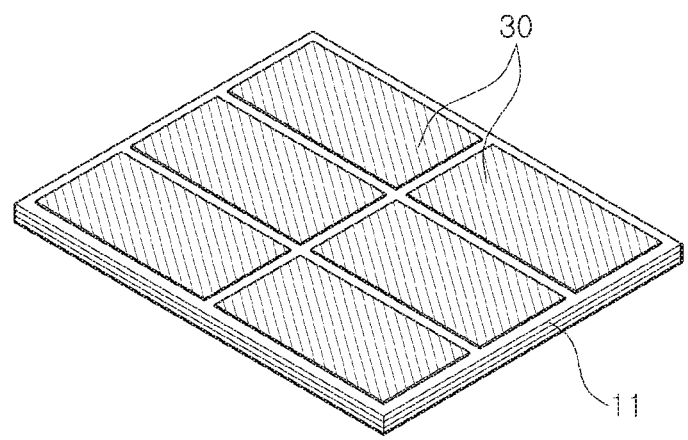
Figure 9D:
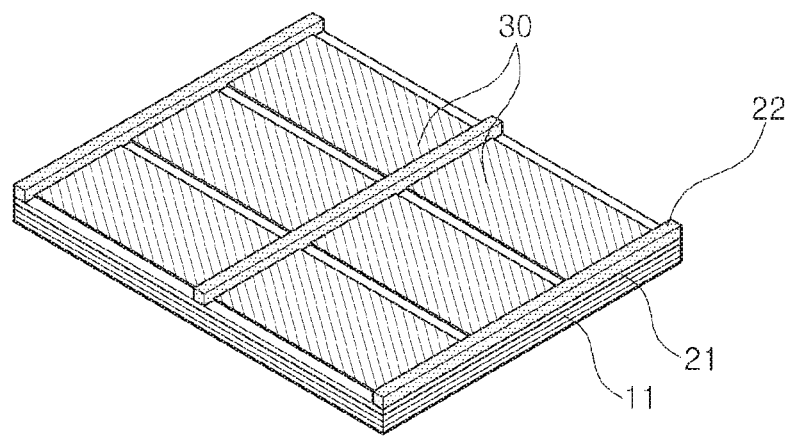
Figure 9E:
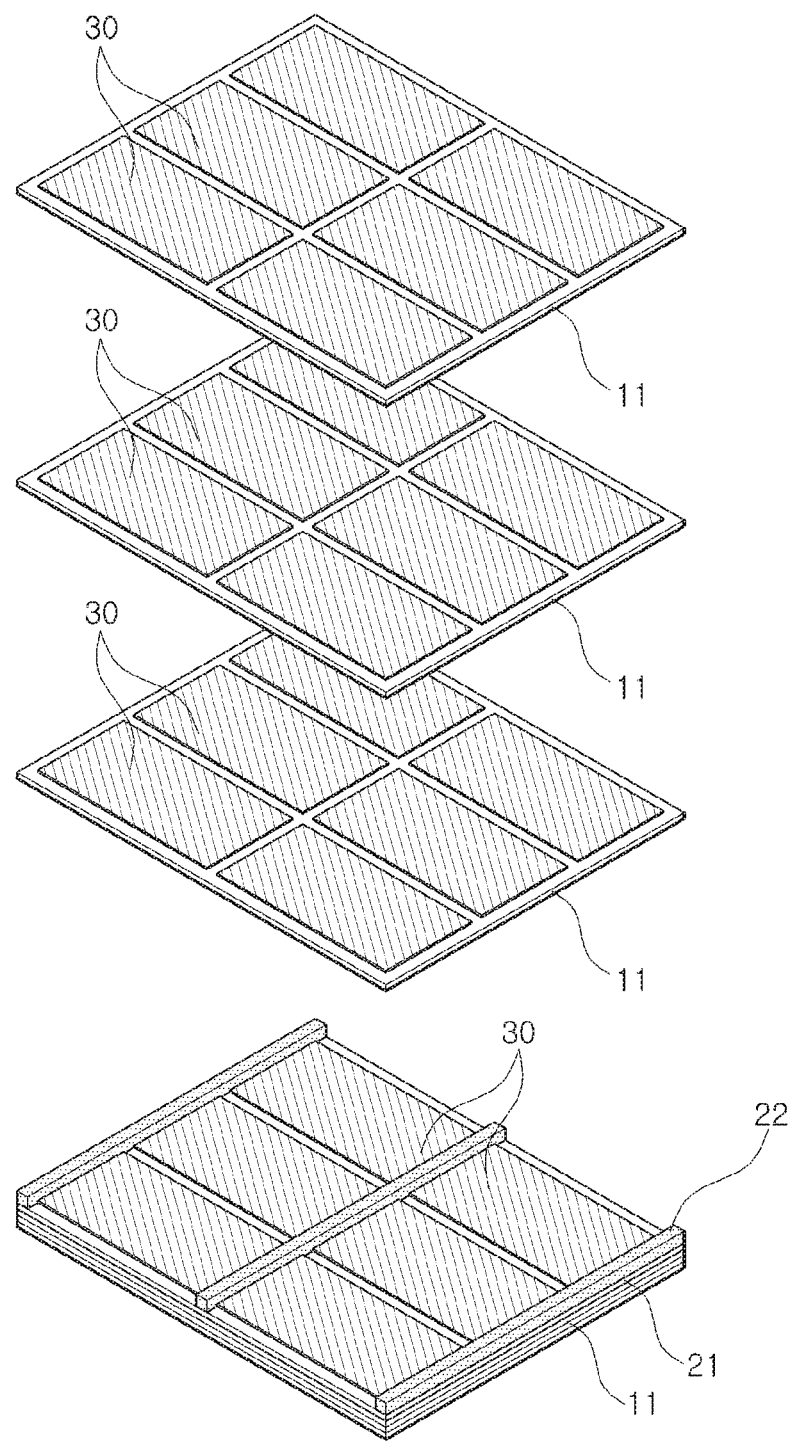

Although FIG. 7E illustrates three first ceramic green sheets 11 on which the internal electrode pattern 30 is formed by applying the conductive metal paste may be stacked on the second ceramic green sheet 21, the number of stacked first ceramic green sheets 11 is not limited thereto.

The first ceramic green sheet 11 stacked on the second ceramic green sheet 21 may be stacked one by one, or a unit of the stacked first ceramic green sheets 11 may be stacked.

In this case, the second ceramic green sheet 21 on which the step portion absorption layer is formed may be stacked so as to be inserted between one unit composed of a plurality of first ceramic green sheets 11 and another unit adjacent to one unit, and the number of stacked ceramic green sheets may be increased by repeating this method.

The stacked ceramic green sheets and the internal electrode paste may be compressed to each other by stacking the plurality of ceramic green sheets and pressing the plurality of ceramic green sheets in a stacking direction.

As a result, the ceramic multilayer body in which the ceramic green sheet and the internal electrode paste are alternately stacked may be manufactured.

The second ceramic green sheet 21 of which the ceramic member 22 is formed on both end portions may form the step portion absorption layer in a margin portion of the ceramic multilayer body.

The rate at which step portions are generated may be decreased by the step portion absorption layer, thus improving withstand voltage characteristics.

The ceramic multilayer body may be cut per a region corresponding to one capacitor to be formed in a chip form.

The ceramic multilayer body may be cut so that the respective ends of the first and second internal electrode patterns are alternately exposed to end surfaces of the cut ceramic multilayer body.

The multilayer body in chip form may be sintered, for example, at 1200° C. or so, thereby manufacturing a ceramic body including the dielectric layers and the first internal electrode and the second internal electrode.

The first and second external electrodes may be formed to cover respective ends of the ceramic body and to be electrically connected to the first and second internal electrodes exposed to end surfaces of the ceramic body, respectively.

Plating treatment using nickel, tin, or the like, may be performed on surfaces of the external electrodes.

FIGS. 8A through 8E are process views illustrating a method of manufacturing a multilayer ceramic capacitor according to another exemplary embodiment in the present disclosure.

Referring to FIGS. 8A through 8E, the method of manufacturing a multilayer ceramic capacitor may be the same as the method of manufacturing a multilayer ceramic capacitor illustrated in FIGS. 7A through 7E except for forming a ceramic member 22 only in a region of a margin portion of an active region in a width direction of a ceramic body at the time of forming the ceramic member 22 on a second ceramic green sheet 21.

FIGS. 9A through 9E are process views illustrating a method of manufacturing a multilayer ceramic capacitor according to another exemplary embodiment in the present disclosure.

Referring to FIGS. 9A through 9E, the method of manufacturing a multilayer ceramic capacitor may be the same as the method of manufacturing a multilayer ceramic capacitor illustrated in FIGS. 7A through 7E except for forming a ceramic member 22 only in a region of a margin portion of an active region in a length direction of a ceramic body at the time of forming the ceramic member 22 on a second ceramic green sheet 21.

The following Table 1 illustrates data obtained by comparing capacitances and withstand voltage characteristics of a multilayer ceramic capacitor depending on a bend angle of end portions of first and second internal electrodes in a stacking direction of the first internal electrode and the second internal electrode.

TABLE 1

| Sample No. | Bend Angle (Degrees) | Capacitance | Withstand Voltage Characteristics |
|---|---|---|---|
| 1* | 1 | X | ⊚ |
| 2* | 2 | X | ⊚ |
| 3* | 3 | X | ⊚ |
| 4 | 4 | ○ | ⊚ |
| 5 | 6 | ○ | ⊚ |
| 6 | 7 | ○ | ○ |
| 7 | 8 | ○ | ○ |
| 8 | 9 | ⊚ | ○ |
| 9 | 10 | ⊚ | ○ |
| 10 | 11 | ⊚ | ○ |
| 11 | 13 | ⊚ | ○ |
| 12 | 14 | ⊚ | ○ |
| 13* | 15 | ⊚ | X |
| 14* | 18 | ⊚ | X |

*Comparative Example

In Table 1, a capacitance higher than a target capacitance by 10% or more was determined to be excellent (⊚), a capacitance equal to or higher than the target capacitance by 10% or less was determined to be good (○), and a capacitance lower than the target capacitance was determined to be defective (x).

In Table 1, a withstand voltage higher than a target withstand voltage by 10% or more was determined to be excellent (⊚), a withstand voltage equal to or higher than the target withstand voltage by 10% or less was determined to be good (○), and a withstand voltage lower than the target withstand voltage was determined to be defective (x).

Referring to Table 1, it may be appreciated that in a case in which the bend angle θ of the end portions of the first internal electrode and the second internal electrode was in a range between 3 to 15 degrees, capacitance was high, withstand voltage characteristics were excellent, and reliability was improved.

In contrast, in samples 1 to 3 corresponding to cases in which the bend angle θ of the end portions of the first internal electrode and the second internal electrode was less than or equal to 3 degrees, capacitance was decreased, and in samples 13 and 14 in which the bend angle θ of the end portions of the first internal electrode and the second internal electrode was more than or equal to 15 degrees, withstand voltage characteristics deteriorated.

As set forth above, according to exemplary embodiments in the present disclosure, the step portion problem may be solved by disposing at least one separate dielectric layer of which the step portion absorption layer is disposed on the margin portion of the active region contributing to capacitance formation, such that the high-capacitance multilayer ceramic electronic component in which the withstand voltage characteristics are improved may be implemented.

While exemplary embodiments have been shown and described above, it will be apparent to those skilled in the art that modifications and variations could be made without departing from the scope of the present invention as defined by the appended claims.

What is claimed is:

1. A multilayer ceramic electronic component comprising:
    a ceramic body including an active region contributing to capacitance formation and with alternately stacked dielectric layers and first and second internal electrodes, and a protective layer on at least one of upper and lower surfaces of the active region;
    first and second external electrodes electrically connected to the first and second internal electrodes, respectively, and on respective ends of the ceramic body; and
    a step portion absorption layer disposed between the first and second internal electrodes in at least one of: both end portions of the ceramic body in a length direction or both end portions of the ceramic body in a width direction;
    wherein a total thickness of adjacent dielectric layers disposed between adjacent first and second internal electrodes in a same plane as the step portion absorption layer is greater than a thickness of a dielectric layer disposed in another region.

2. The multilayer ceramic electronic component of claim 1, wherein a number of dielectric grains in the dielectric layers disposed in the same plane as the step portion absorption layer is greater than that in the dielectric layer disposed in another region.

3. The multilayer ceramic electronic component of claim 1, wherein the step portion absorption layer has a thickness greater than 10 times a thickness of one of the alternatively stacked dielectric layers.

4. The multilayer ceramic electronic component of claim 1, wherein the step portion absorption layer is disposed in a region corresponding to a margin portion of the active region in the width direction of the ceramic body.

5. The multilayer ceramic electronic component of claim 1, wherein the step portion absorption layer is disposed in a region corresponding to a margin portion of the active region in the length direction of the ceramic body.

6. The multilayer ceramic electronic component of claim 1, wherein end portions of two internal electrodes adjacent to the step portion absorption layer among the first internal electrode and the second internal electrode are bent in directions away from the adjacent step portion absorption layer in a stacking direction of the first internal electrode and the second internal electrode.

7. The multilayer ceramic electronic component of claim 6, wherein a bend angle of the end portions of the first internal electrode and the second internal electrode is between 3 to 15 degrees, based on a stacking surface of the dielectric layer.

8. A multilayer ceramic electronic component comprising:
    a ceramic body including an active region contributing to capacitance formation and with alternately stacked dielectric layers and internal electrodes, and a protective layer on at least one of upper and lower surfaces of the active region;
    external electrodes electrically connected to the respective internal electrodes and on respective ends of the ceramic body; and
    a plurality of gap portions disposed in both end portions of the active region of the ceramic body, wherein end portions of alternate internal electrodes adjacent to each of the gap portions are bent in opposite directions in a stacking direction of the internal electrodes;
    wherein a distance between two internal electrodes adjacent to each of the gap portions is greater than a distance between two other internal electrodes.

9. The multilayer ceramic electronic component of claim 8, wherein at least one of the gap portions has a thickness greater than 10 times a thickness of one of the alternatively stacked dielectric layers.

10. The multilayer ceramic electronic component of claim 8, wherein at least one of the gap portions is disposed in a region corresponding to a margin portion of the active region in a width direction of the ceramic body.

11. The multilayer ceramic electronic component of claim 8, wherein at least one of the gap portions is disposed in a region corresponding to a margin portion of the active region in a length direction of the ceramic body.

12. The multilayer ceramic electronic component of claim 8, wherein a bend angle of the end portions of two internal electrodes adjacent to at least one of the gap portions is between 3 to 15 degrees, based on a stacking surface of the dielectric layer.

13. The multilayer ceramic electronic component of claim 8, wherein a number of dielectric grains in dielectric layers disposed in the same plane as at least one of the gap portions is greater than that in a dielectric layer disposed in another region.

14. A multilayer ceramic electronic component comprising:
    a ceramic body including an active region contributing to capacitance formation and with alternately stacked dielectric layers and internal electrodes, and a protective layer on at least one of upper and lower surfaces of the active region;
    external electrodes electrically connected to the respective internal electrodes and on respective ends of the ceramic body; and
    a plurality of gap portions disposed in both end portions of the active region of the ceramic body;
    wherein end portions of alternate internal electrodes adjacent to each of the gap portions are bent in opposite directions in a stacking direction of the internal electrodes, and
    wherein internal electrodes adjacent to each of the gap portions are bent in directions away from the gap portion in the stacking direction of the internal electrodes.

15. The multilayer ceramic electronic component of claim 14, wherein at least one of the gap portions has a thickness greater than 10 times a thickness of one of the alternatively stacked dielectric layers.

16. The multilayer ceramic electronic component of claim 14, wherein at least one of the gap portions is disposed in a region corresponding to a margin portion of the active region in a width direction of the ceramic body.

17. The multilayer ceramic electronic component of claim 14, wherein at least one of the gap portions is disposed in a region corresponding to a margin portion of the active region in a length direction of the ceramic body.

18. The multilayer ceramic electronic component of claim 14, wherein a bend angle of end portions of two internal electrodes adjacent to at least one of the gap portions is between 3 to 15 degrees, based on a stacking surface of the dielectric layer.

19. The multilayer ceramic electronic component of claim 14, wherein a number of dielectric grains in dielectric layers disposed in the same plane as at least one of the gap portions is greater than that in a dielectric layer disposed in another region.

20. The multilayer ceramic electronic component of claim 14, wherein a distance between two internal electrodes adjacent to at least one of the gap portions is greater than a distance between two other internal electrodes.

21. A multilayer ceramic electronic component comprising:
 a ceramic body including a plurality of first internal electrodes and a plurality of second internal electrodes alternately disposed between dielectric layers, and a step portion absorption layer disposed in a margin area extending along and facing the side surfaces of the ceramic body; and
 first and second external electrodes electrically connected to the plurality of first internal electrodes and the plurality of second internal electrodes, respectively, and on the ceramic body,
 wherein the step portion absorption layer is disposed between a first internal electrode of the plurality of first internal electrodes and a second internal electrode of the plurality of second internal electrodes,
 wherein a total thickness of one of the dielectric layers disposed in a same plane as the step portion absorption layer is greater than a thickness of one of the dielectric layers disposed in another region.

22. The multilayer ceramic electronic component of claim 21, wherein the step portion absorption layer has a thickness greater than 10 times a thickness of one of the dielectric layers disposed directly between first and second internal electrodes.

23. The multilayer ceramic electronic component of claim 21, wherein there are a plurality of step portion absorption layers and a plurality of internal electrodes are disposed between each pair of step portion absorption layers.

24. The multilayer ceramic electronic component of claim 23, wherein a number of dielectric grains one of the dielectric layers disposed in a same plane as one of the step portion absorption layers is greater than that in one of the dielectric layers disposed in another region.

25. The multilayer ceramic electronic component of claim 21, wherein a height of the step portion absorption layer in a lengthwise portion of the margin area is equal to or less than half of a height of the step portion absorption layer in a widthwise margin portion of the margin area.

26. The multilayer ceramic electronic component of claim 21, wherein end portions of two of internal electrodes adjacent to the step portion absorption layer are bent in directions away from the adjacent step portion absorption layer in a stacking direction.

27. The multilayer ceramic electronic component of claim 26, wherein a bend angle of the end portions of the internal electrodes is between 3 to 15 degrees, based on a stacking surface of the dielectric layers.

* * * * *